C. SMITH.
AUTOMATIC MACHINE FOR MAKING METALLIC FRAMES FOR WREATHS.
APPLICATION FILED SEPT. 2, 1920.

1,394,796.

Patented Oct. 25, 1921.
5 SHEETS—SHEET 1.

WITNESSES.
INVENTOR.
Charles Smith
By Henry Marsh Jr.
ATTY

C. SMITH.
AUTOMATIC MACHINE FOR MAKING METALLIC FRAMES FOR WREATHS.
APPLICATION FILED SEPT. 2, 1920.
1,394,796.
Patented Oct. 25, 1921.
5 SHEETS—SHEET 2.
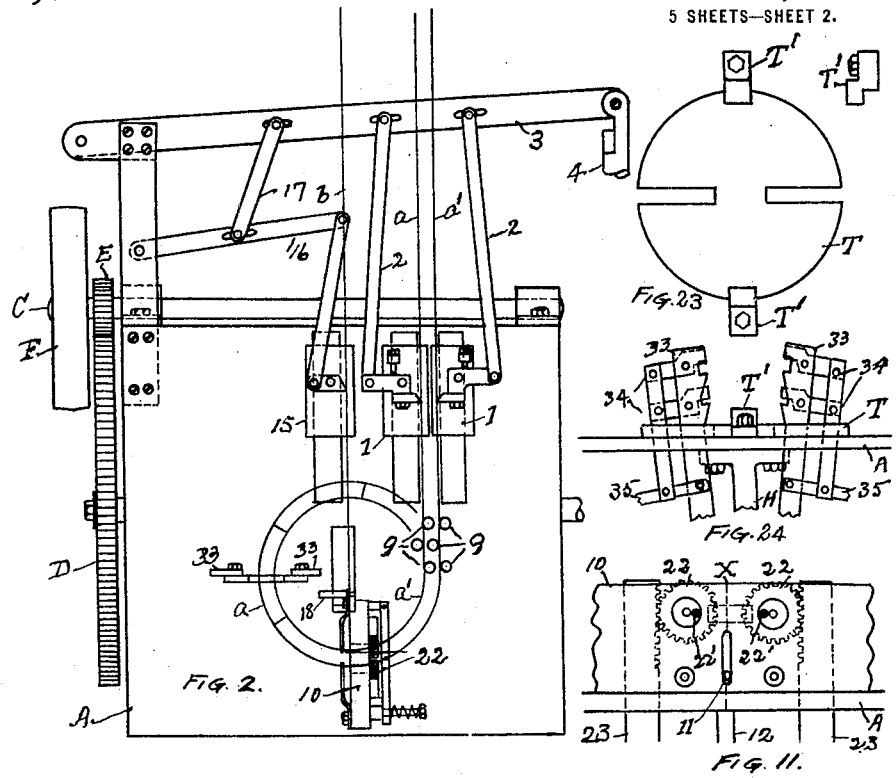
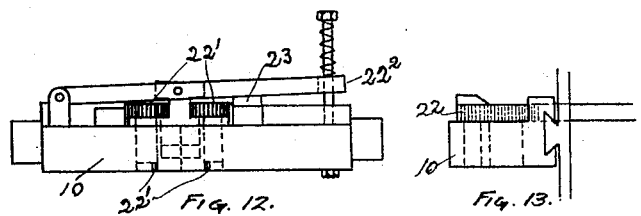
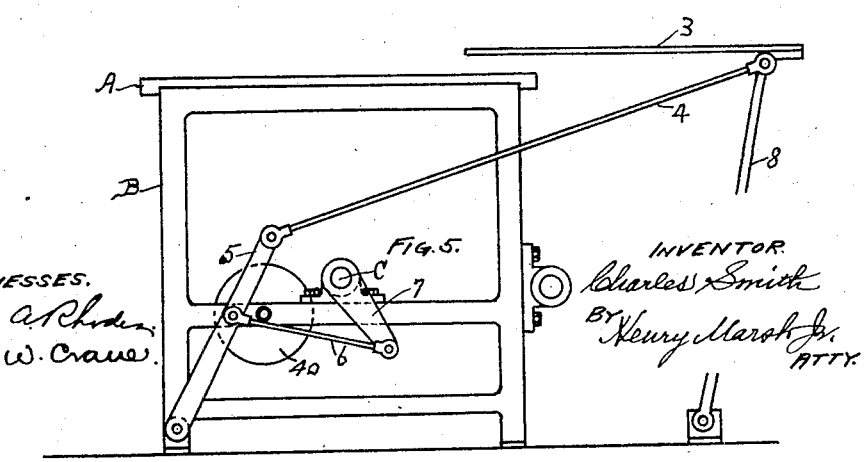
WITNESSES.
INVENTOR.
Charles Smith
BY Henry Marsh Jr.
ATTY.

C. SMITH.
AUTOMATIC MACHINE FOR MAKING METALLIC FRAMES FOR WREATHS.
APPLICATION FILED SEPT. 2, 1920.
1,394,796.
Patented Oct. 25, 1921.
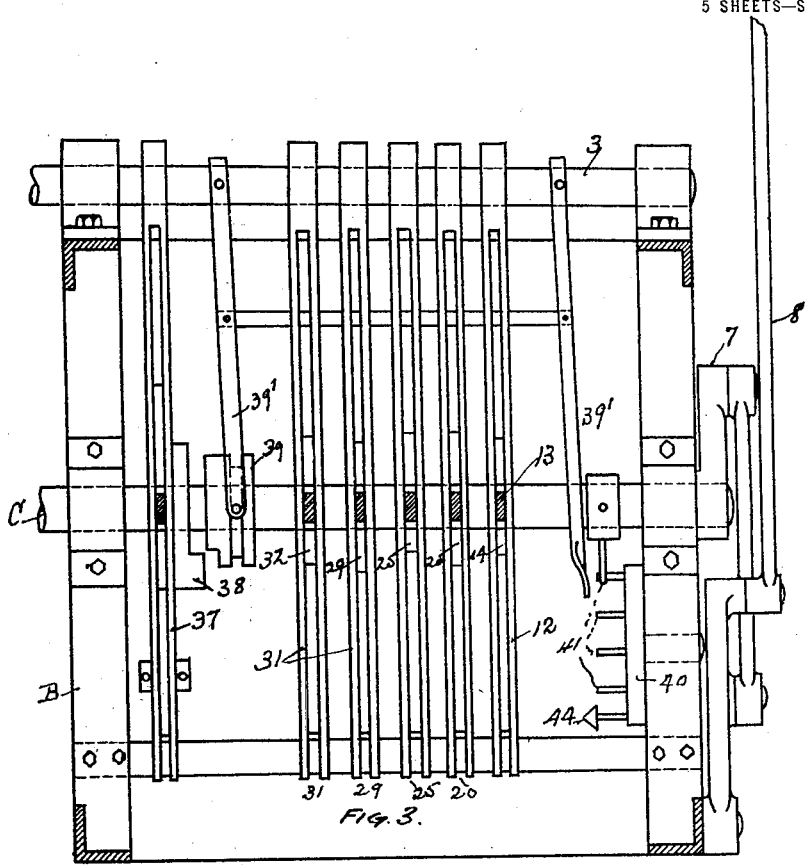
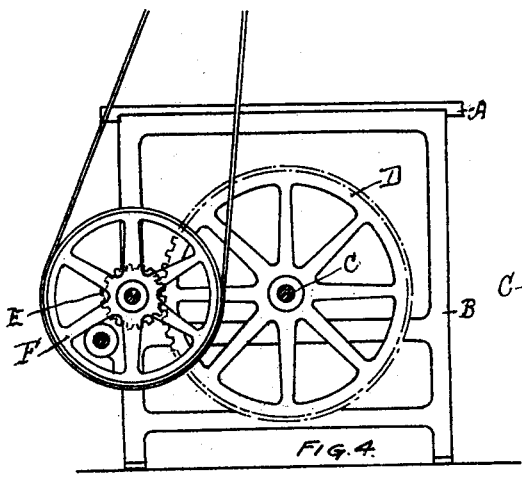
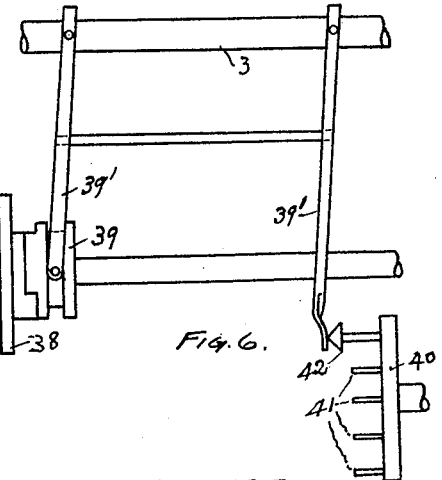
WITNESSES
INVENTOR
Charles Smith
BY Henry Marsh Jr.
ATTY.

C. SMITH.
AUTOMATIC MACHINE FOR MAKING METALLIC FRAMES FOR WREATHS.
APPLICATION FILED SEPT. 2, 1920.
1,394,796.
Patented Oct. 25, 1921.
5 SHEETS—SHEET 5.
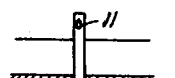
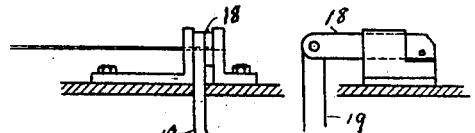
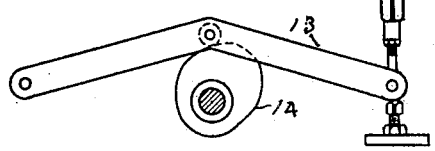
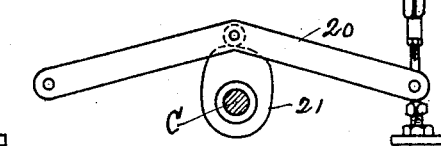
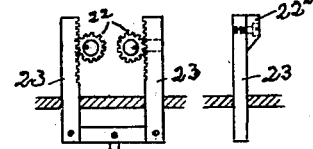
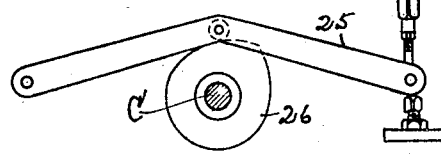
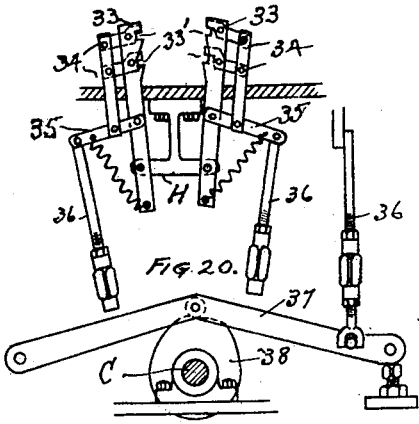

UNITED STATES PATENT OFFICE.

CHARLES SMITH, OF PROVIDENCE, RHODE ISLAND.

AUTOMATIC MACHINE FOR MAKING METALLIC FRAMES FOR WREATHS.

1,394,796.	Specification of Letters Patent.	Patented Oct. 25, 1921.

Application filed September 2, 1920. Serial No. 407,731.

*To all whom it may concern:*

Be it known that I, CHARLES SMITH, a citizen of the United States, residing at Providence, in the county of Providence and State of Rhode Island, have invented a new and useful Automatic Machine for Making Metallic Frames for Wreaths, of which the following is a specification.

The purpose of my invention is to provide a machine which will automatically form from a plurality of wires a rigid circular skeleton frame of rectangular cross section provided with strengthening cross braces of wire disposed at uniform distances apart on and at right angles to the frame body, with provision of means for readily adjusting the machine for the making of frames of different sizes.

To these ends my invention consists in the new and novel construction, combination and arrangement of parts hereinafter described and illustrated in the accompanying drawings, in which—

Fig. 2 is a plan view of the machine.

Fig. 3 is a plan view of the machine with the table top removed.

Fig. 4 is an end elevation of the machine, showing the drive.

Fig. 5 is a similar view showing the main wire feed mechanism.

Fig. 6 is a plan view of the clutch and lever actuating the main wire cutter.

Figure 14:
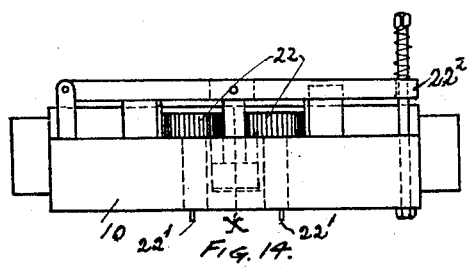

Figs. 11, 12, 13, 14, 15 and 16 are detail views of the parts of the mechanism for bending the cross wire around the main wires. Fig. 14 is a plan view showing the cross wire bending pinions and connected parts with the pinion shafts protruded preparatory to bending the upper ends of the cross wires around the upper main wires of the wreath frame. Fig. 12 is a similar view of the same showing the pinion shafts withdrawn after the operation of bending said cross wire ends is completed.

Fig. 17 is an elevation and side view of the cross wire cutter, and its actuating mechanism.

Figs. 18 and 19 show details of the cross wire bending pliers and their actuating mechanism.

Fig. 20 is a detail view of the main wire cutters and connected parts.

Figure 21:
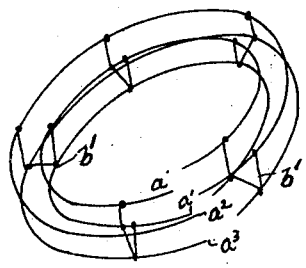

Fig. 21 is a perspective view of the wreath frame as it leaves the machine.

Figure 22:
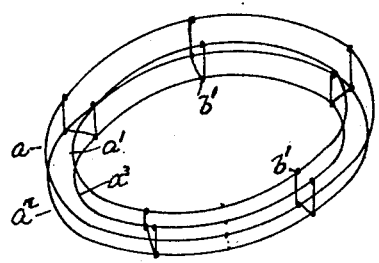

Fig. 22 is a perspective view of the completed wreath frame.

Fig. 23 is a plan view of the movable plate through which the main wire cutters operate.

Fig. 24 is an elevation showing the relation of the table, the movable plate and main wire cutters to each other.

Like reference letters and numerals indicate like parts throughout the drawings.

In the drawings A represents the table of the machine, B, the frame and C the shaft journaled in said frame and carrying the various cams for actuating the respective operative parts of the machine. Said shaft carries a gear D which meshes with a pinion E carried by the drive pulley F.

On the table A are mounted reciprocating tension jaws which feed the main wires into the machine; oppositely disposed sets of staggered rolls which bend said wires simultaneously into concentric rings; a reciprocating tension jaw which feeds a single wire into the machine at right angles to the path of the main wires; the cross wire cutter; the cross wire bending means, and the main wire cutters.

Figure 1:
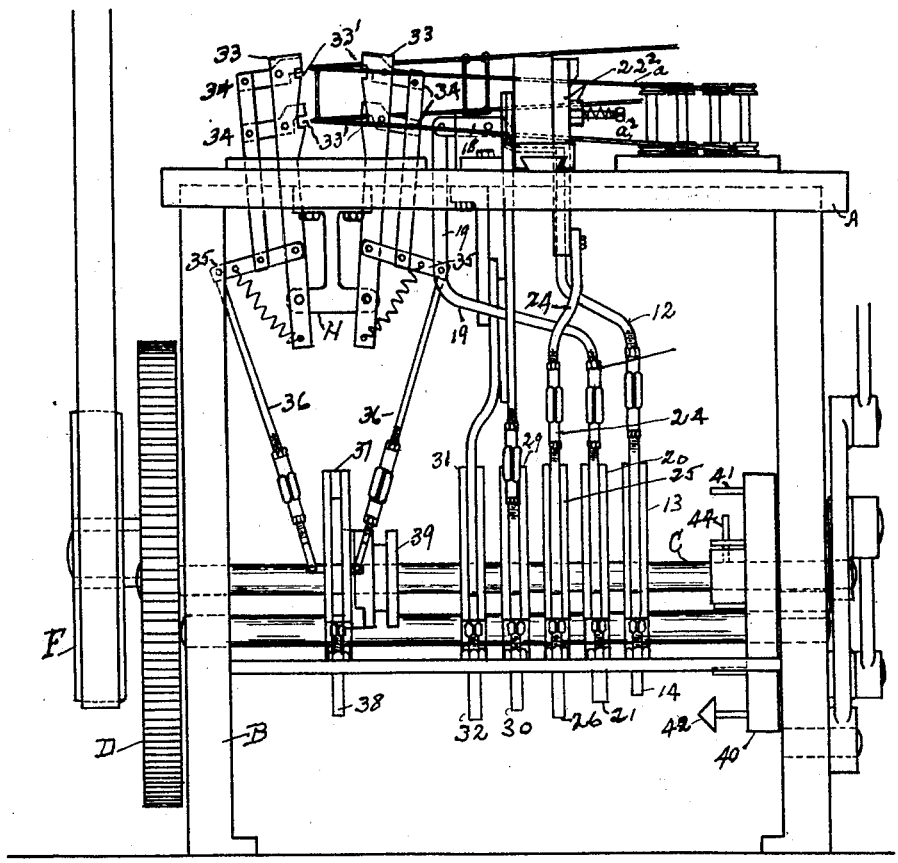
Figure 1 is a front elevation of the machine, the main wire feed omitted.
Figure 7:
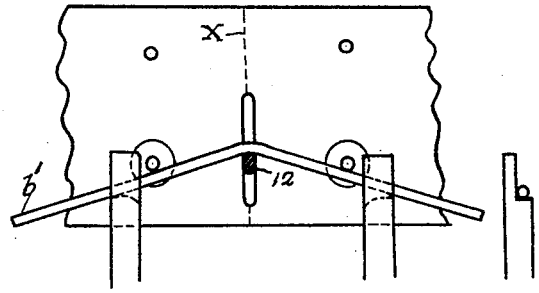
Fig. 7 is a front view showing the crosswire bent into V-shape preparatory to its being bent around the lower pair of main wires with the pliers in position to turn its free ends upward into contact with the upper pair of main wires. And a side view of the upper end of one of the plier jaws.

The reciprocating tension jaws 1, 1, are disposed parallel with each other and spaced a distance apart and each arranged to engage two wires $a$, $a^1$, $a^2$, $a^3$, (which I term the main wires) disposed one immediately above the other and feed them into the machine in parallel pairs spaced a distance apart with one pair immediately above the other pair in the form of a skeleton of rectangular cross section. Said jaws 1, 1, are by links 2, 2, operatively connected with the pivoted arm or lever 3 which is by the rod 4 lever 5 and rod 6 operatively connected with the crank 7 carried on the shaft C. The free ends of said lever 3 is supported by the rocker rod 8 pivoted on said lever at one end and on the floor at its opposite end. (Fig. 4). Said jaws feed the main wires into and through the oppositely disposed sets of staggered rolls 9 by which said wires retaining their relative positions are simultaneously bent into concentric rings thereby forming a circular skeleton of rectangular cross section. The rolls are preferably grooved near each end to maintain the main wires in their relative positions as they are fed along. (Figs. 1, 2). Upon the table A in advance of said rolls is mounted a stationary member 10 appropriately pierced to allow the passage therethrough of the wires as they are fed along. Said member 10 is provided with a centrally located vertically directed slot through which extends and operates a horizontally directed arbor 11 carried on the vertically reciprocating rod 12 operatively connected with a lever 13 actuated by a cam 14 carried on the shaft C. (Figs. 1, 15). Said arbor is arranged and adapted on its upward movement to bend a piece of the cross wire up into inverted V-shape preparatory to its being formed into a cross brace for the main wires. (Fig. 7). And on its downward movement to release said piece so that it may be engaged by the pliers hereinafter described and bent around the main wires. Said pierced member 10 also serves to maintain the main wires in their relative positions during their passage and also to hold them during the operation of bending the cross wire piece about them, as will be hereinafter described.

By dividing the member 10 centrally as on the dotted line X in Figs. 11, 14 and moving said parts away from each other longitudinally, and correspondingly separating the sets of rolls 9, and changing the angular relation of the main wire cutters 33, 33 to said main wires I am enabled to adjust the machine for the making of frames of different diameters. In such case the arbor 11 does not extend through the slot but retains otherwise its original position, as do the other parts of the machine.

A plate T secured on the table A by dogs $T^1$, $T^1$, and having oppositely disposed radial open slots $T^2$, $T^2$, is movable at will in both directions on said table for purpose of adjusting the angularity of the cutter jaws to the main wires of the frame to enable them to operate on frames of different sizes. (Figs. 23, 24).

Mounted on the table A parallel with and a distance from the tension jaws 1, 1, is another reciprocating tension jaw 15 which by the jointed lever 16 and link 17 is operatively connected to the lever 3 (Fig. 2), and is arranged and adapted to feed a single wire $b$ (which I term the cross wire) below and at right angles to the path of the main wires $a$, $a^1$, $a^2$, $a^3$ and forward of the member 10. A cutter 18 mounted on the table A and disposed across the path of the cross wire is operatively connected through the rod 19, with a lever 20 actuated by a cam 21 carried on the shaft C. When the cross wire has been fed along below the path of the main wires into a position immediately below the lower pair of main wires the cutter 18 is operated to cut from the free end of said wire a piece $b^1$ of sufficient length to be bent up around all the main wires as hereinafter described. The arbor 11 is then actuated and in its upward movement bends said piece $b^1$ into inverted V-shape (Fig. 7). Revolubly mounted on shafts having endwise movement in the member 10 are pinions 22, 22, each centrally pierced to allow the passage therethrough of the upper main wires $a$, $a^1$, and each pinion is provided with a horizontally directed pin $22^1$ and actuated by a vertically reciprocating rack 23 operatively connected by a rod 24 with a lever 25 actuated by a cam 26 carried on the shaft C, to bring said pins 22 into engagement with the free ends of the cross wire piece $b^1$ to bend them around said upper main wires, after said cross wire piece has been brought into the proper position by the pliers as hereinafter described. A spring controlled lever $22^2$ pivoted on said member 10 normally holds the pins $22^1$ protruded for engagement with the free ends of the piece $b^1$, and said rack beveled on one face on its movement will force outward said lever and allow the pins $22^1$ to withdraw from engagement with said free ends after the operation of bending them around the upper main wires is completed. (Figs. 12, 14.)

Figure 10:
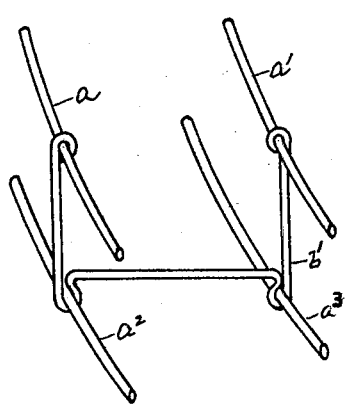
Fig. 10 shows the cross wire bent around the main wires to form a rigid brace to the frame.
Figure 8:
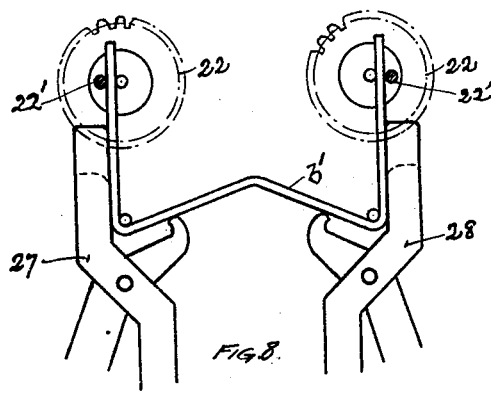
Figs. 8 and 9 show steps in the bending of the cross wire around the four main wires.
Figure 9:
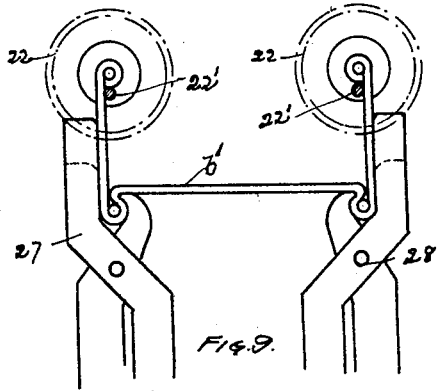

Oppositely disposed pliers 27, 28 each having a straight jaw shouldered at its upper end and a hook shaped jaw, the arm of each straight jaw connected to a lever 29 actuated by a cam 30 carried on the shaft C, and the arm of each hooked jaw similarly connected to another lever 31 actuated by a cam 32 carried on said shaft C (Figs. 1, 18, 19) operate to first straighten the cross wire piece $b^1$ after it has been bent into inverted V-shape and then turn its free end upward against the upper main wires, after which the jaws of the pliers close together and bend the said piece $b^1$ around the lower main wires (Figs. 8, 9). The pinions 22, $22^1$ then bend the free ends of the piece $b^1$ around the upper main wires (Fig. 9) and the piece $b^1$ is thus formed into a cross brace to the four main wires. (Fig. 10.) It will be noted that the arms of the respective jaws of the pliers 27, 28, are separately operatively connected with the common shaft C, and that said jaws are thereby actuated in unison to restore the cross piece of wire to its normal straight shape, bend the said wire around the lower main wires of the frame and turn its free ends up into position against the upper main wires in the path of the pinions 22, 22¹.

A turn buckle 36¹ on each connecting rod 36 affords means for adjusting the length of said rods as may be required by different positions of the cutter jaws 33, 33, and each rod 36 is connected with the lever 37 by a joint which permits said rods to turn to accommodate themselves to the different positions of said cutter jaws, and table T.

These operations of the cutter 18, arbor 11, pliers 27, 28 and pinions 22, 22, are timed relatively to the feed movements of the main wires and cross wire and are repeated at regular predetermined intervals so that said pieces $b^1$ are successively bent into cross braces disposed at uniform distances apart on and at right angle to the main wires.

As soon as the main wires have been fed along to complete a circle the main wire cutters consisting of the oppositely disposed laterally separable jaws 33, 33, each provided with laterally directed notches 33¹, 33¹, adapted to receive and hold the main wires during the operation of the cutters 34, 34 pivoted on said jaws 33, 33 and registering with said notches. The jaws 33, 33 are each pivoted on a hanger H secured to the table A, and are each by a lever 35 and a connecting rod 36, operatively connected with a lever 37 which is actuated by a cam 38 loosely carried on the shaft C and in turn actuated by a clutch 39 slidingly carried on said shaft and actuated by the engagement of the arms 39¹ attached to the pivoted lever 3 with a horizontally extending pin 42 carried on a revoluble disk 40 journaled on the frame B as said pin 42 is hit by a pin 44 carried on the shaft C. Said disk 40 carries (in the form shown in the drawings) five other horizontally projecting pins 41 each disposed in the path of the pin 44 as the latter revolves with the shaft C, said pins 41 are shorter than the pin 44 and therefore the pin 44 actuates the arm 39¹ only on each sixth revolution of the shaft C, and consequently the main wire cutters will be actuated only on each sixth revolution of the shaft C. The cams carried on the shaft C are respectively timed relatively to each other and are all operated from that shaft in common so that the several operations will take place in regular order and at predetermined intervals. A spiral guide on the table A forward of the cross wire cutter guides the four main wires so that their free ends will, on the completion of the circle, be held above and away from the main cutters so as not to interfere with the operation of the latter. After the main wires are cut to form the wreath frame the resiliency of the wires returns their free ends to their normal position and the ends of the main wires are then soldered or otherwise secured together to form the completed frame. (Fig. 22.)

In the practical operation of my invention the four main wires are fed along through the rolls and the stationary member 11, the cross wire simultaneously fed along below and at right angles to the lower pair of main wires, and a piece $b^1$ is cut from its free end and by the arbor bent into inverted V-shape, the arbor then receding said piece is then engaged by the pliers 34, 34 and straightened in its mid section while its free ends are by the straight jaws of the pliers 27, 28 turned upward against the upper main wires (Fig. 8) and engaged by the projecting pins 22¹ of the pinions 22, 22 and bent around the upper main wires, the curved plier jaws at the same time acting to crimp the cross wire around the lower pair of main wires. When these operations have been completed the cross wire piece is firmly secured upon all the main wires, (Figs. 9, 10) and the operations are repeated until the required number of cross braces have been secured on the main wires.

I claim as my invention and desire to secure by Letters Patent:

1. In an automatic machine for making metallic frames for wreaths having means for feeding a plurality of wires into the machine in parallel pairs spaced a distance apart with one pair immediately above the other pair in skeleton form of rectangular cross section, means for bending said wires concurrently into concentric circles in skeleton form of rectangular cross section; means for feeding a single wire into the machine at right angles to said first mentioned wires and below the lower pair of the latter; means for cutting from the free end of said single wire successively pieces of sufficient length to be bent up around all said first mentioned wires, the combination with said parts of a vertically reciprocating arbor arranged and adapted on its upward movement to bend said cut off pieces into inverted V-shape midway of their length; oppositely disposed pliers alined with each other and each having a straight jaw and a curved jaw, each jaw separately operatively connected to a common shaft whereby said jaws are actuated in unison to restore said cut off pieces to their normal straight form, bend said pieces around the lower pair of the first mentioned wires and turn the ends of said pieces up against the upper pair of said first mentioned wires; means for bending the up turned ends of said pieces around the upper pair of said first mentioned wires, means for cutting all said first mentioned wires simultaneously at a common point, means for actuating the whole from a common shaft, and supporting means for the whole.

2. In a machine of the character described the combination with a common shaft of oppositely disposed pliers, each plier having a straight jaw and a curved jaw, and each jaw separately operatively connected with said shaft whereby said jaws are actuated in unison as and for the purposes specified.

3. In a machine of the character described revoluble reciprocating shafts each carrying pinions on one end, a spring controlled lever arranged and adapted to hold said shafts in their forward position, vertically reciprocating racks engaging said pinions and carrying means for releasing said shafts from said spring control, oppositely disposed pliers alined with each other, each plier having a straight jaw and a curved jaw, each jaw separately operatively connected with a common shaft, in combination with each other and with means for actuating the whole from a common shaft.

4. In an automatic wreath frame making machine of the character described a plate mounted on the table of the machine for movement in either direction and provided with radial open slots, oppositely disposed laterally separable wire cutter jaws extending through said slots and operating therein in opening and closing, in combination with each other and with means for actuating said cutter jaws.

5. In an automatic machine of the character described, for making frames for wreaths, revoluble reciprocating shafts provided with longitudinal extensions at one end and carrying pinions at their opposite end, a spring controlled lever arranged and adapted to hold said shafts in their forward position, vertically reciprocating racks engaging said pinions and carrying means for releasing said shafts from said spring control, all in combination with each other and with means for actuating said racks.

CHARLES SMITH.

Witnesses:
HENRY MARSH, Jr.,
MENDELL W. CRANE.